Patented June 30, 1942

2,288,531

UNITED STATES PATENT OFFICE 2,288,531

BENZENESULPHONAMIDE COMPOUNDS

Josef Klarer, Wuppertal-Elberfeld, Germany, assignor to Winthrop Chemical Company, Inc., New York, N. Y., a corporation of New York No Drawing. Application January 16, 1940, Serial No. 314,093. In Germany January 27, 1939

2 Claims. (Cl. 260—556)

This invention relates to benzenesulphone amide compounds.

In accordance with the present invention chemotherapeutically active products are obtainable by the manufacture of 4-aminomethyl-benzenesulphonamides, their azomethine derivatives and the bisulphite addition products of the latter. The amino group of the sulphonamide group may be derived from ammonia as well as from the most varied primary or secondary organic amines, such as methylamine, dimethylamine, ethylamine, diethylamine, propylamine, butylamine, benzylamine, furthermore from heterocyclic amines, such as aminothiazoles and aminopyridines. The said amide group may also be substituted by acyl radicals, such as the acetyl and benzoyl radical. The organic radicals substituting the amide group may themselves contain substituents such as free or substituted amino- or hydroxyl groups as for instance in the hydroxyethyl group and the methoxyethyl group. The azomethine groups may be derived from the most varied aliphatic, aromatic, araliphatic and heterocyclic aldehydes which themselves may be substituted in the usual manner for instance by hydroxyl, alkoxy, nitro, halogen and sulpho groups. Valuable water-soluble compounds are, for instance, obtained by the manufacture of azomethine compounds of the kind specified containing carboxylic or sulphonic acid groups or a plurality of aliphatically bound hydroxyl groups in the azomethine radical. Also those compounds which are formed by the addition of bisulphite to the azomethine compounds are distinguished by a good solubility in water. Suitable aldehydes are for instance butyraldehyde, crotonaldehyde, heptylaldehyde, benzaldehyde and various substituted benzaldehydes, phenylacetaldehyde, cinnamaldehyde, furthermore particularly aldoses, such as glucose, galactose, lactose and maltose. The bisulphite addition compounds of the azomethine compounds are formed by the addition of bisulphite to the double-bond. In the presence of more than one double-bond, more than one bisulphite radical may enter as for instance in the case of the cinnamylidene compound.

Products of the kind specified have an increased solubility in water when compared with 4-aminobenzene sulphonamide which is characterized by an aromatic amino group. Furthermore the aqueous solution of the mineral acid salts of the new products do not react acid to Congo as the salts of 4-aminobenzene-sulphonamide.

In accordance with the present invention the said new compounds are preferably prepared by converting a substituent which is convertible into an amino group and is attached to a methyl group standing in the 4-position of a benzenesulphonamide. Thus, for instance, 4-acylaminomethyl-, 4-urethanomethyl- or 4-isocyanatomethyl-benzenesulphonamides may be saponified or nitromethyl-benzenesulphonamides may be reduced to the corresponding 4-aminomethyl compounds, or 4-halogenmethyl-benzenesulphonamides or 4-hydroxymethyl-benzenesulphonamides may be reacted with ammonia or with products splitting off ammonia, such as hexamethylenetetramine, or the respective derivatives of 4-(carboxymethyl)-benzenesulphonamides may be transformed into the 4-aminomethyl-benzenesulphonamides corresponding to Hofmann's, Curtius' or Lossen's method.

Furthermore a group containing carbon and nitrogen and being linked by the carbon atom to the 4-position of a benzenesulphonamide may be transformed into the aminomethyl group corresponding to methods known per se. For instance, in benzenesulphonamides which contain in the 4-position an aldehyde derivative group containing nitrogen, for instance, in compounds of the kind of the benzaldoximes, benzaldehyde-, hydrazones and hydrobenzamides, the aldehyde derivative group may be reduced to the amino methyl group for instance catalytically or electrolytically or by means of alkali metal amalgam or by alkali metal, zinc, tin, stannous salts and chromo compounds. Also benzenesulphonamides containing an aldehyde group in the 4-position may be used while transforming this aldehyde group in a single working stage into the amino methyl group by first reacting with ammonia or its substitution products, such as hydroxylamine or hydrazine and reducing the products formed in the reaction mixture as indicated above. The aldehyde compound may be, for instance, treated with a product which simultaneously serves for furnishing the ammonia and the reducing agent, such as ammonium formiate or amino acetic acid. Furthermore 4-cyanobenzenesulphonic acid amides or benzenesulphonamides containing a nitrogenous carboxylic acid derivative group in the 4-position, for instance 4-carboxy amido-, 4-carboxy thioamido- and 4-carbamidino-benzenesulphonamides may be reduced to 4-aminomethyl-benzenesulphonamides.

The 4-aminomethyl-benzenesulphonamides are also obtained by condensation of 4-aminomethyl-benzene with N-disubstituted amino sulphohalides in the presence of condensing agents according to Friedel Crafts, or a sulphonamide group may be introduced into the 4-aminomethyl-benzene by reacting upon 4-aminomethyl-benzenesulphonic esters or halides in which advantageously the amino group is protected, with ammonia or an amine of the kind above specified, whereupon the protecting radical eventually is split off subsequently.

The azomethine derivatives of the 4-aminomethyl-benzenesulphonamides may be obtained by reacting upon the 4-aminomethyl-benzenesulphonamides with an aliphatic, aromatic, araliphatic or heterocyclic aldehyde or a substitution product or derivative thereof, such as ammonia compounds, acetales or semi-acetales. In order to obtain water-soluble compounds aldehydes or derivatives thereof of the kind specified may be used which are substituted by acid groups such as the carboxylic or sulphonic acid group or by a plurality of aliphatically bound hydroxyl groups as in the aldosugars (mono- and disaccharides). The azomethine compounds may also be obtained by reacting 4-(azomethine-methyl)-benzenesulphohalides as may be obtained for instance by the action of halogen sulphonic acids upon azomethinemethyl-benzenes, with ammonia or a primary or secondary amine.

The above-mentioned bisulphite addition compounds may be prepared by reacting with bisulphite upon the 4-(azomethine-methyl)-benzenesulphonamides or by reacting 4-aminomethyl-benzenesulphonamides with an aldehyde, acetale or semi-acetale (including formaldehyde) and bisulphite in optional sequence. The said bisulphite addition products are N-alkylsulphonic acids of the 4-aminomethyl-benzenesulphonamides which, depending on the kind of aldehyde used, may be substituted in the alkyl group.

The new products thus obtainable have proved to be highly active in the treatment of bacterial infectious diseases.

The invention is illustrated by the following examples without being restricted thereto:

*Example 1*

23 grams of 4-acetylaminomethyl-benzenesulphonic acid amide are heated to boiling in 60 ccs. of a 20% sodium hydroxide solution for 1 hour. The solution obtained is treated with animal charcoal and the 4-aminomethyl-benzenesulphonic acid amide after filtering is precipitated with ammonium chloride from the filtrate. The mixture is well cooled, sucked off and the precipitate washed with ice-water. The new compound is obtained from water or methylalcohol in colorless crystals melting at 153° C. It is extremely easily soluble in warm water, dilute sodium hydroxide solution and hydrochloric acid.

For the preparation of the starting-material 50 grams of acetylbenzylamine are introduced while stirring into 150 ccs. of chlorosulphonic acid, whereby the temperature is kept below 40° C. by external cooling. After several hours' storing at ordinary temperature the mixture is heated for 1 hour in the boiling water-bath and after cooling poured on to ice. Thereupon the 4-acetylaminoethyl-benzenesulphonic acid chloride precipitates at first in an oily form, but solidifies after short stirring to crystals. The product sucked off and washed with cold water is introduced into a 10% aqueous ammonia solution. Thereby dissolution takes place while heating and after a short time the 4-acetylaminomethyl-benzenesulphonic acid amide precipitates in a crystalline form. After heating to 70° C. for 30 minutes the solution is cooled, filtered with suction and washed out. The product is obtained when recrystallized from water or dilute alcohol in colorless crystals melting at 177° C. It is readily soluble in warm water, extremely readily soluble in dilute sodium hydroxide solution.

*Example 2*

25 grams of 4-acetylaminomethyl-benzenesulphonic acid methylamide are heated to boiling in 60 ccs. of a 20% sodium hydroxide solution for 60 minutes. After cooling the impurities are removed by filtering with suction and the 4-aminomethyl-benzenesulphonic acid methylamide obtained is precipitated from the filtrate with ammonium chloride. The mixture is filtered with suction and recrystallized from water. Colorless crystals melting at 100° C. are obtained. They are very readily soluble in warm water, dilute sodium hydroxide solution and hydrochloric acid.

For the preparation of the starting material the 4-acetylaminomethyl-benzenesulphonic acid chloride described in Example 1 is introduced into excess aqueous methylamine. The solution obtained precipitates after heating to 50° C. for 30 minutes soon crystals of the 4-acetylaminomethyl-benzenesulphonic acid methylamide, which after cooling are sucked off and washed out with ice-water. When recrystallized from water the compound is obtained in the form of colorless crystals melting at 103° C. It is readily soluble in warm water as well as in sodium hydroxide solution. It can be precipitated from the alkaline solution with ammonium chloride.

In an analogous manner the 4-aminomethyl-benzenesulphonic acid ethylamide, hydroxyethylamide, butylamide and benzylamide are obtained when using ethylamine, hydroxyethylamine, butylamine or benzylamine, respectively, instead of methylamine.

*Example 3*

27 grams of 4-acetylaminomethyl-benzenesulphonic acid dimethylamide are heated to boiling in 60 ccs. of a 20% sodium hydroxide solution for 60 minutes. Complete dissolution takes place. The mixture is purified with animal charcoal and the filtrate is cooled with ice. Thereupon the 4-aminomethyl-benzenesulphonic acid dimethylamide precipitates. It is recrystallized from water. Colorless crystals melting at 135° C. are obtained. They are readily soluble in dilute hydrochloric acid, but insoluble in cold sodium hydroxide solution.

For the preparation of the starting-material the 4-acetyl-aminomethyl-benzenesulphonic acid chloride described is introduced into excess aqueous dimethylamine and the solution obtained is kept at 50° C. for 30 minutes. After cooling the 4-acetylaminomethyl-benzenesulphonic acid dimethylamide is obtained in crystals melting after recrystallization from dilute alcohol at 125° C.

In an analogous manner the 4-aminomethyl-benzene-sulphonic acid diethylamide is obtained when using diethylamine instead of dimethylamine.

*Example 4*

100 grams of phenyl acetic acid ethylester are introduced into 300 ccs. of chlorosulphonic acid while stirring and cooling with ice. After 12 hours' storing at ordinary temperature the solution is poured on to ice, whereupon benzenesulphonic acid chloride-4-acetic acid ethylester precipitates. The latter is introduced into aqueous 10% ammonia solution while stirring. The benzenesulphonic acid amide-4-acetic acid ethylester precipitates as a crystalline paste. When recrystallized from alcohol it is obtained in colorless crystals melting at 172° C.

100 grams of benzenesulphonic acid amide-4-acetic acid ethylester are treated with excess concentrated aqueous ammonia for 24 hours at ordinary temperature while stirring. The crystal form thereby has changed. The benzenesulphonic acid amide-4-acetic acid amide formed is filtered with suction, washed with water and recrystallized from water. It is obtained in the form of colorless crystals melting at 190° C.

21 grams of the amide are covered with a solution of 8 grams of bromine in 160 ccs. of 10% sodium hydroxide solution and heated for 30 minutes on the water-bath. The solution is concentrated, acidified with concentrated hydrochloric acid and shaken with animal charcoal. After filtration with suction the hydrochloride of the 4-amino-methyl-benzenesulphonamide is precipitated by cooling. After redissolution from water it is obtained in the form of colorless leaflets melting at 265° C. If the solution is acidified with mandelic acid instead of hydrochloric acid, the mandelic acid salt is obtained in crystals melting at 215° C.

*Example 5*

50 grams of benzylurethane are introduced while stirring into 150 ccs. of chlorosulphonic acid in such a way that the temperature does not rise above 25° C. The solution obtained is poured on to ice after 12 hours' stirring and the 4-carbethoxyamino-methyl-benzenesulphochloride precipitated is filtered with suction and washed. It is introduced into excess 10% aqueous ammonia solution. The temperature thereby rises and is kept for 10 minutes at 40–50° C. After cooling the mixture, the 4-carbethoxyamino-methyl-benzenesulphonamide is filtered with suction, washed and recrystallized from dilute alcohol. Colorless crystals melting at 143° C. are obtained.

The saponification to the 4-aminomethyl-benzenesulphonamide is performed as described in Example 1 for the 4-acetylaminomethyl-benzenesulphonamide.

*Example 6*

20 grams of the n-(4'-methylbenzal)-benzylamine formed from equimolecular quantities of benzylamine and 4-tolyl-aldehyde are introduced while stirring into 60 ccs. of ice-cooled chlorosulphonic acid. The mixture is carefully poured on to ice after 10–12 hours' stirring, the precipitate obtained filtered with suction at once and washed out with ice-water. The 4-(4'-methylbenzal-aminomethyl)-benzenesulphochloride thus obtained is introduced into a 10% aqueous ammonia solution while stirring and the mixture is stored for 15 minutes at 30° C. A crystalline paste of 4-(4'-methylbenzal-aminomethyl)-benzenesulphonamide is thus obtained which is recrystallized from a great quantity of alcohol after filtering with suction and washing out. The colorless crystals being readily soluble in dilute sodium hydroxide solution melt at 212° C.

20 grams of the methylbenzal compound are boiled for 10 minutes in 40 ccs. of aqueous 20% hydrochloride. The odor of tolylaldehyde can be perceived at once, and on cooling of the solution treated with animal charcoal the hydrochloride of the 4-aminomethyl-benzenesulphonamide precipitates in crystals which melt at 265° C. when recrystallized from water or methylalcohol.

*Example 7*

21 grams of 4-aminobenzene-sulphonacetylamide are diazotized with 7.0 grams of sodium nitrite. The diazo solution is poured into a solution of 25 grams of copper sulphate, 150 ccs. of water and 30 grams of potassium cyanide at 50° C. Thereupon the mixture is kept at 70° C. for 30 minutes, then cooled and filtered with suction. The precipitate is extracted by boiling with methanol. By evaporation of the methanol and repeated redissolution of the residue from alcohol the 4-cyanbenzene-sulphonacetylamide is obtained in light yellow leaflets melting at 210° C. For the reduction of the nitrile group 18 grams of sliced sodium are added at once to the boiling solution of 10 grams of the nitrile in 150 ccs of absolute alcohol. The violent reaction is maintained in its violence by heating until the last sodium particles have dissolved. Traces of ammonia direct to a slight saponification of the cyanogen radical. After a complete consumption of the sodium the alcohol is evaporated and the cooled residue is taken up with a small quantity of water and made acid to Congo by means of hydrochloric acid. The hydrochloride of the 4-amino-methyl-benzenesulphonamide which has formed by saponification of the intermediately formed 4-aminomethyl-benzene-sulphonacetylamide precipitates from the solution containing a large quantity of sodium chloride. When recrystallized from water it melts at 265° C.

*Example 8*

10 grams of phenylnitromethane are poured into 30 ccs. of ice-cooled chlorosulphonic acid. The intensely colored solution is stirred for 12 hours at ordinary temperature and then poured on to ice. The 4-nitromethyl-benzene-sulphonic acid chloride precipitated is filtered with suction, washed with water and poured into excess 10% aqueous ammonia solution. The solution becoming warm is kept at 50° C. for 15 minutes When the ammonia has been expelled the 4-nitromethyl-benzenesulphonic acid amide precipitates in light yellow colored crystals. They are soluble in dilute sodium hydroxide solution with the same color. When recrystallized from alcohol they melt at 141° C.

21.6 grams of 4-nitromethyl-benzenesulphonic acid amide are boiled in a mixture of 75 ccs. of 15% hydrochloric acid and 15 grams of tin until all the nitro compound has dissolved. After treatment with hydrogen sulphide and removal of the tin sulphide, the mixture is evaporated. The crystalline hydrochloride of the 4-aminomethyl-benzene-sulphonamide is obtained which, when recrystallized from water, shows the properties described in Example 4.

*Example 9*

24.7 grams of 4-acetylaminomethyl-benzenesulphonic acid chloride are added to a mixture of 9.4 grams of α-aminopyridine, 75 ccs. of acetone and 8.4 grams of sodium bicarbonate while stirring. After 1 hour's heating to boiling the acetone is distilled off and the oily residue is boiled with 50 ccs. of 20% sodium hydroxide solution for 20–30 minutes. After the addition of animal charcoal the mixture is filtered with suction and the filtrate strongly cooled. After some time the sodium salt of the 4-aminomethyl - benzenesulphonic acid - (α - pyridyl - amide) crystallizes. It is recrystallized from sodium chloride solution. It is readily soluble in water and does not show a distinct melting point.

In an analogous manner the 4-aminomethyl-benzenesulphonic acid-β- and γ-pyridyl-amide are obtained with β- and γ-aminopyridine, respectively, the 4-aminomethyl-benzenesulphonic acid-(β'-aminopyridyl-β)-amide with β'-acetylamino-β-aminopyridine and subsequent splitting off of the acetyl groups the 4-aminomethyl-benzenesulphonic acid-2'-thiazolylamide, -4'-methyl-2'-thiazolylamide, -4'-phenyl-2' - thiazolylamide and -2'-benzothiazolylamide when using 2-aminothiazole, 4-methyl-2-aminothiazole, 4-phenyl-2-aminothiazole or 2-amino-benzothiazole, respectively.

Example 10

25 grams of 4-bromomethyl-benzenesulphonamide are introduced into 200 ccs. of a solution of ammonia in alcohol saturated in the cold. The mixture is stored at ordinary temperature for three days. After this time the mixture is heated under reflux until the excess ammonia is removed. Thereupon the ammonium chloride precipitated and the di- or tribenzylamine formed in a small quantity are filtered with suction and the filtrate is concentrated. The 4-aminomethyl-benzenesulphonamide is thus obtained in the form of the free base which after dissolution in a small quantity of hot water is converted into its sulphosalicylate by the addition of a hot concentrated aqueous solution of the equimolecular quantity of 5-sulpho-2-hydroxybenzoic acid. The salt is likewise readily soluble in water. It is obtained after recrystallization from water in solid colorless crystals melting at 252° C.

Example 11

18.6 grams of 4-aminomethyl-benzenesulphonamide are heated to boiling in 40 ccs. of alcohol. 10.6 grams of benzaldehyde are added to the solution. The reaction proceeds while boiling. The mixture is still kept boiling for 30 minutes. Already in the heat crystals of the 4-(benzylidene-aminomethyl)-benzenesulphonamide precipitate from the solution. After cooling the precipitate is filtered with suction and recrystallized from dilute alcohol. The benzylidene compound is thus obtained in the form of colorless crystals melting at 157° C. They are insoluble in water, readily soluble in dilute cold sodium hydroxide solution.

If the 4-methoxy-benzaldehyde is used instead of the benzaldehyde the 4-(4'-methoxybenzylidene-aminomethyl)-benzenesulphonamide is obtained in colorless crystals melting at 187° C., if using the 4-tolylaldehyde the 4-(4'-methylbenzylidene - aminomethyl) - benzenesulphonamide melting at 210° C., if using the 2-hydroxybenzaldehyde the 4-(2'-hydroxybenzylidene-aminomethyl)-benzenesulphonamide in the form of lemon-coloured crystals melting at 162° C., if using the 3-methoxy-4-hydroxy-benzaldehyde (vanilline) the 4-(3'-methoxy-4'-hydroxybenzylideneaminomethyl)-benzenesulphonamide in light yellow colored crystals melting at 175° C.

Example 12

37 grams of 4-aminomethyl-benzenesulphonamide are dissolved in 100 ccs. of alcohol in the heat. 27 grams of cinnamaldehyde are added to the solution. The reaction proceeds while boiling and the mixture solidifies to a crystalline paste. The mixture is still kept boiling for 15 minutes and then cooled down. The crystals are filtered with suction and recrystallized from dilute alcohol. The 4-(cinnamylidene-aminomethyl)-benzenesulphonamide is obtained in colorless crystals melting at 156° C. It is readily soluble in dilute cold sodium hydroxide solution, but insoluble in water.

30 grams of 4-(cinnamylidene-aminomethyl)-benzenesulphonamide are suspended in 150 ccs. of water and heated to boiling with 21 grams of sodium bisulphite. After about 20 minutes the whole is completely dissolved. After addition of animal charcoal the mixture is filtered with suction and the filtrate is concentrated under reduced pressure. After treatment with alcohol the sodium 4 - (γ-phenylpropylaminomethyl)-benzenesulphonamide-α-γ-disulphonate formed is filtered with suction and recrystallized from a small quantity of sodium chloride solution in the form of colorless crystals. It is readily soluble in water.

Example 13

18.6 grams of 4-aminomethyl-benzenesulphonamide are heated to boiling in 50 ccs. of methylalcohol with 20 grams of glucose for about 2 hours. After the addition of animal charcoal the mixture is filtered with suction and the filtrate is poured while stirring into 150 ccs. of ether. The mass precipitating which in the beginning is somewhat viscous soon decomposes to an amorphous powder, which is filtered with suction and washed with ether. The glucoside of the 4-aminomethyl-benzenesulphonamide thus obtained is dissolved for purification purposes in a small quantity of methylalcohol, in which it is very readily soluble, the solution is treated with animal charcoal and after filtration ether is added while stirring until a precipitate is formed. The compound is obtained as a colorless powder which is readily soluble in water.

The galactoside, lactoside and maltoside of the 4-aminomethylbenzenesulphonamide are obtained in an analogous manner.

Example 14

18.6 grams of 4-aminomethylbenzenesulphonamide and 11.5 grams of heptylaldehyde are heated to boiling in 50 ccs. of alcohol for about 6 hours. After this time aldehyde odor has disappeared. After some standing crystals of the 4 - (heptylideneaminomethyl)-benzenesulphonamide precipitate. When recrystallized from alcohol the compound is obtained in colorless crystals melting at 136° C.

Example 15

The concentrated aqueous solution of 18.6 grams of 4-aminomethylbenzenesulphonamide is treated in the heat with 14.5 grams of formaldehyde bisulphite. The reaction proceeds while boiling. The reaction is finished after half an hour's boiling. Now the sodium N-methanesulphonate of the 4-aminomethyl-benzenesulphonamide is precipitated from the aqueous solution with alcohol and filtered with suction. The compound is obtained from an aqueous sodium chloride solution in colorless crystals which are readily soluble in water.

Example 16

A warm aqueous solution of 22 grams of 4-chlorobenzaldehyde-2-sulphonic acid is caused to drop into the boiling solution of 18.6 grams of 4-aminomethyl-benzenesulphonamide in 40 ccs. of alcohol. Thereupon the mixture is still kept boiling for 5 hours, the reaction solution is treated with animal charcoal and filtered with suction. On concentration of the filtrate under reduced pressure crystals of the 4-(4'-chloro-benzylideneaminomethyl) - benzenesulphonamide-2'-sulphonic acid precipitate. They can be recrystallized from dilute alcohol. They are readily soluble in water.

*Example 17*

50 grams of 4'-nitrobenzylidene-benzylamine are poured into 150 ccs. of pure chlorosulphonic acid gradually so that the temperature does not rise above 25° C. The yellow colored solution is stirred for some time and poured on to a great quantity of ice. The 4-(4'-nitrobenzylidene-aminomethyl)-benzenesulphonic acid chloride hereby precipitates at first as an oil which on stirring with water soon solidifies in a crystalline form. The sulphonic acid chloride is dissolved in acetone and the solution is poured into an excess of 20% aqueous ammonia solution while stirring, and the mixture is heated to 30° C. for a short time. The crystals of the 4-(4'-nitro-benzylidene-aminomethyl) - benzenesulphonamide precipitate from the solution already in the heat. When recrystallized from alcohol the compound is obtained in the form of yellow needles melting at 217° C.

I claim:

1. Compounds of the following formula

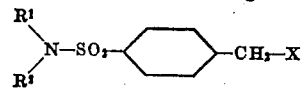

wherein $R^1$ is a substituent selected from the class consisting of hydrogen, alkyl, phenylalkyl, hydroxyalkyl, alkoxyalkyl, carboxylic acid acyl and heterocylic radicles, $R^2$ is a substituent selected from the class consisting of hydrogen and alkyl, and X is a substituent selected from the class consisting of amino and carboxylic acid-acylamino groups.

2. Compounds as defined in claim 1, wherein X is amino.

JOSEF KLARER.